US009944297B2

(12) United States Patent
Buzzetti et al.

(10) Patent No.: US 9,944,297 B2
(45) Date of Patent: Apr. 17, 2018

(54) SYSTEM AND METHOD FOR ESTIMATING THE DRIVING STYLE OF A VEHICLE

(71) Applicants: E-NOVIA S.R.L., Milan (IT); DRIVE2GO S.R.L., Milan (IT); UNIFLOTTE S.R.L., Bologna (IT)

(72) Inventors: Alex Buzzetti, Soragno (IT); Stefano Soliano, Milan (IT); Guglielmo Calabrese, Bologna (IT)

(73) Assignees: E-NOVIA S.r.l., Milan (IT); DRIVE2GO S.r.l., Milan (IT); UNIFLOTTE S.r.l., Balogna (IT)

( * ) Notice: Subject to any disclaimer, the term of this patent is extended or adjusted under 35 U.S.C. 154(b) by 50 days.

(21) Appl. No.: 15/104,547

(22) PCT Filed: Dec. 9, 2014

(86) PCT No.: PCT/IB2014/066718
§ 371 (c)(1),
(2) Date: Jun. 15, 2016

(87) PCT Pub. No.: WO2015/104598
PCT Pub. Date: Jul. 16, 2015

(65) Prior Publication Data
US 2017/0028991 A1 Feb. 2, 2017

(30) Foreign Application Priority Data
Jan. 10, 2014 (IT) .............. MI2014A0023

(51) Int. Cl.
B60W 40/09 (2012.01)
B60W 40/107 (2012.01)
(Continued)

(52) U.S. Cl.
CPC .......... B60W 40/09 (2013.01); B60W 40/107 (2013.01); B60W 50/14 (2013.01);
(Continued)

(58) Field of Classification Search
CPC .... B60W 40/09; B60W 40/107; B60W 50/14; G09B 9/052
See application file for complete search history.

(56) References Cited

U.S. PATENT DOCUMENTS 5,357,798 A 10/1994 Weinzerl et al.

FOREIGN PATENT DOCUMENTS

DE 4314826 A1 * 11/1994 ............. B60K 28/16
DE 4314826 A1 11/1994
(Continued)

OTHER PUBLICATIONS

International Search Report in PCT/IB2014/066718 dated Mar. 23, 2015.

Primary Examiner — Jerrah Edwards
Assistant Examiner — Kelly D Williams
(74) Attorney, Agent, or Firm — Manelli Selter PLLC; Edward J. Stemberger

(57) ABSTRACT

A system (1) and method estimates the driving style of a vehicle. The system includes;
 a device for measuring the longitudinal acceleration ($a_x$) and lateral acceleration ($a_y$) of a vehicle along a measuring path;
 a memory module (7) in which pairs of the admissible limit values of the longitudinal and lateral accelerations are stored. Such values implement an admissible acceleration curve, closed in a longitudinal acceleration-lateral acceleration plane;
 an elaboration module (6) configured for:
  associating to each measured longitudinal acceleration-lateral acceleration pair of the vehicle a corresponding longitudinal acceleration-lateral acceleration pair on said admissible acceleration curve; and
  providing an indication of the driving style on the basis of the trend of position of the measured longitudinal
(Continued)

acceleration-lateral acceleration pair with respect to the corresponding longitudinal acceleration-lateral acceleration pair on the admissible acceleration curve along the measuring path.

11 Claims, 5 Drawing Sheets

(51) Int. Cl.
*B60W 40/109* (2012.01)
*B60W 50/14* (2012.01)
*G09B 9/052* (2006.01)
*B60Q 9/00* (2006.01)

(52) U.S. Cl.
CPC ............... *G09B 9/052* (2013.01); *B60Q 9/00* (2013.01); *B60W 2050/146* (2013.01); *B60W 2520/105* (2013.01); *B60W 2520/125* (2013.01); *B60W 2540/30* (2013.01)

(56) References Cited

FOREIGN PATENT DOCUMENTS

| | | |
|---|---|---|
| EP | 0777071 A1 | 6/1997 |
| EP | 1498297 A1 | 1/2005 |
| EP | 1780090 A1 | 5/2007 |
| EP | 2537727 A1 | 12/2012 |
| ES | 2341633 A1 | 6/2010 |
| FR | 2748239 A1 | 11/1997 |
| WO | 2011101713 A1 | 8/2011 |

\* cited by examiner

SYSTEM AND METHOD FOR ESTIMATING THE DRIVING STYLE OF A VEHICLE

TECHNICAL FIELD OF THE INVENTION

The object of the present is to provide techniques for estimating the driving style of a vehicle, used by a driver.

PRIOR ART

Several techniques, for estimating the driving style of vehicle drivers, are known. Such techniques should be used in relation to the estimated fuel consumption, to the driver's behavioural safety or to estimate, in general, his driving skills. According to some techniques, the estimation is also made to implement an automatic control of some aspects of the vehicle driving.

The patent application EP-A-1780090 describes a method for defining the driving style of a vehicle driver. Such method comprises the monitoring of various quantities such as: the number of the horn activations, the speed variation, the change in the accelerator position, the angular velocity generated by steering. The estimation is also based on the calculation of the differences between such monitored quantities and predetermined threshold values.

The patent application EP-A-0777071 describes a method, for controlling the automatic transmission of a vehicle, on the basis of the driving style of the driver based, inter alia, on the following information: the opening of the fuel valve, the vehicle speed, the angular velocity of the engine.

The patent application EP-A-1498297 describes a method, for estimating the fuel consumption, which exploits the monitoring of numerous quantities, among which stand: a rotational speed signal of the driving wheel, a rotational speed signal of the engine shaft, a cooling temperature signal, a fuel temperature signal.

The patent application WO 2011/101713 A1 describes a system for estimating the driving style of a motor vehicle, which comprises a measuring device of the kinematic signal, representing the trend of a vehicle motion quantity and a module of low-pass filtering of the kinematic signal, suitable to provide a corresponding filtered reference signal, associated with a reference trend of said quantity. Furthermore, the system comprises an elaboration module for processing the kinematic and the filtered signals, suitable to provide information on the driving style, associated with a comparison between the vehicle motion trend and the reference trend.

SUMMARY OF THE INVENTION

Conventional techniques for estimating the driving style are too complex and onerous from a computational point of view and adopt classification criteria of the driver's style, based on predefined standards that are not always sufficiently realistic. Moreover, in general, they require several instruments and sensors.

The object of the present invention is to propose techniques, for estimating the driving style of vehicles that combine a non-excessive computational complexity with a small number of sensors, leading all the same to a quite realistic and reliable definition of the driving style.

The object of the present invention is achieved through a system for estimating the driving style, as defined by claim 1, and through a method for estimating the driving style, as defined in claim 10.

BRIEF DESCRIPTION OF THE FIGURES

To better understand the invention and appreciate its advantages, some of its non-limiting exemplary embodiments will be described hereafter, with reference to the attached figures, wherein.

DESCRIPTION OF INVENTION EMBODIMENTS

Figure 1:
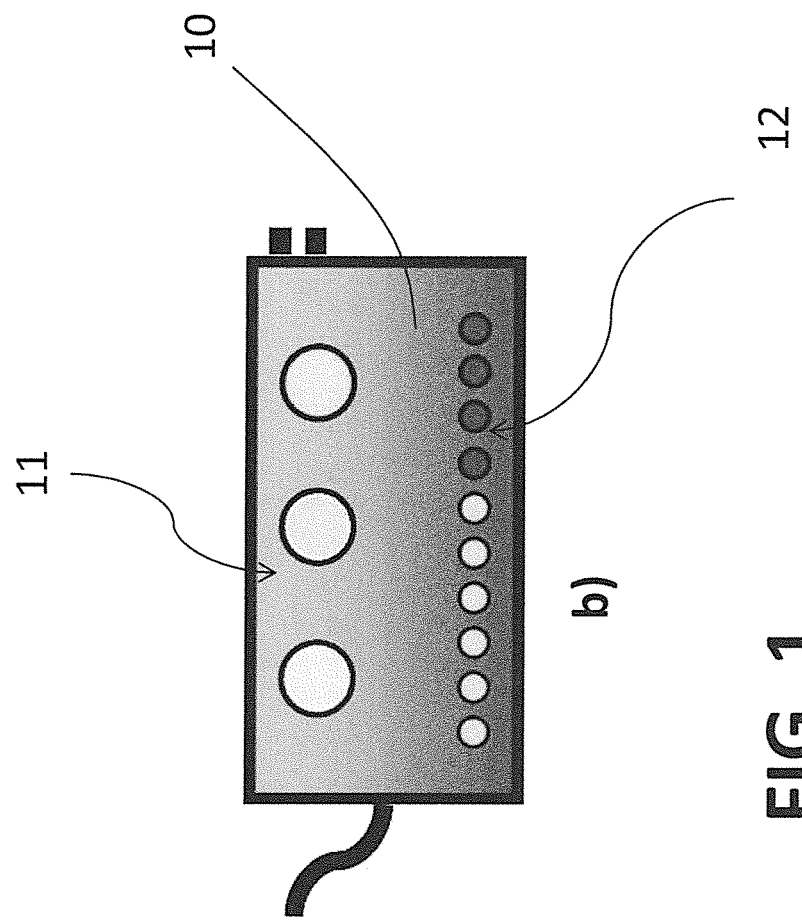
FIG. 1a is a vehicle schematic layout, which can be equipped with a system for estimating the driving style according to the invention.
FIG. 1b is a schematic illustration of a user interface module of the system for estimating the driving style according to the invention.
Figure 1:
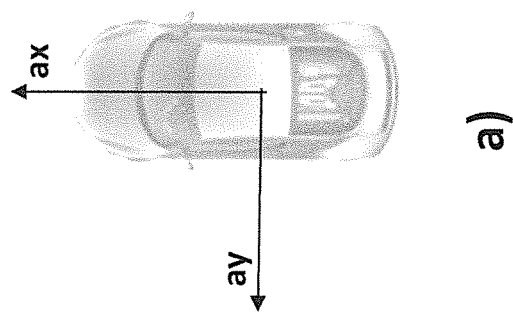

FIG. 1a schematically shows a vehicle, equipped with a system for estimating the driving style of a driver of the vehicle itself. The estimation system comprises a device for measuring the vehicle longitudinal and lateral accelerations. The longitudinal acceleration is labelled with $a_x$ (acceleration along the longitudinal axis x of the vehicle, i.e. along the roll axis), while the lateral acceleration is labelled with $a_y$ (acceleration along the lateral axis $a_y$, i.e. along the pitch axis). The measuring device may comprise, for example, an inertial measurement unit IMU, properly oriented. The measuring device provides electric signals, in particular digital signals. Alternatively, the measuring device can provide electric analog signals that can be converted into digital signals to allow, for example, numerical processings via software.

The measuring device allows detecting the longitudinal and lateral accelerations of the vehicle along a measuring path, i.e. along the path selected for estimating the driving style.

The system for estimating the driving style also comprises an elaboration module which may include a data processing unit or a computer (equipped with memories, processing units and output interfaces), suitable to receive signals coming from the measuring device and to carry out calculations and processings, for estimating the driving style of the vehicle, used by a specific driver.

The elaboration module may be installed in the vehicle or may be remote and be set, for example, in a monitoring centre. Once installed in the vehicle, the data elaboration module may be connected to the measuring device through cables or through wireless systems. For example, the elaboration module may be equipped with a mobile two-way transmitting device, suitable to communicate via a mobile network with a monitoring centre. Alternatively, if the elaboration module is set in the monitoring centre, such mobile two-way transmitting device allows communicating via a further proper mobile two-way transmitting device, installed in the vehicle.

According to a preferred embodiment, the system further comprises a user interface module that allows the driver to be informed in real time on the estimations, carried out by the system, of his driving style. The user interface module is preferably installed in the vehicle. A possible user interface module is shown in FIG. 1b. Further details on the user interface module will be provided hereafter.

Figure 2:
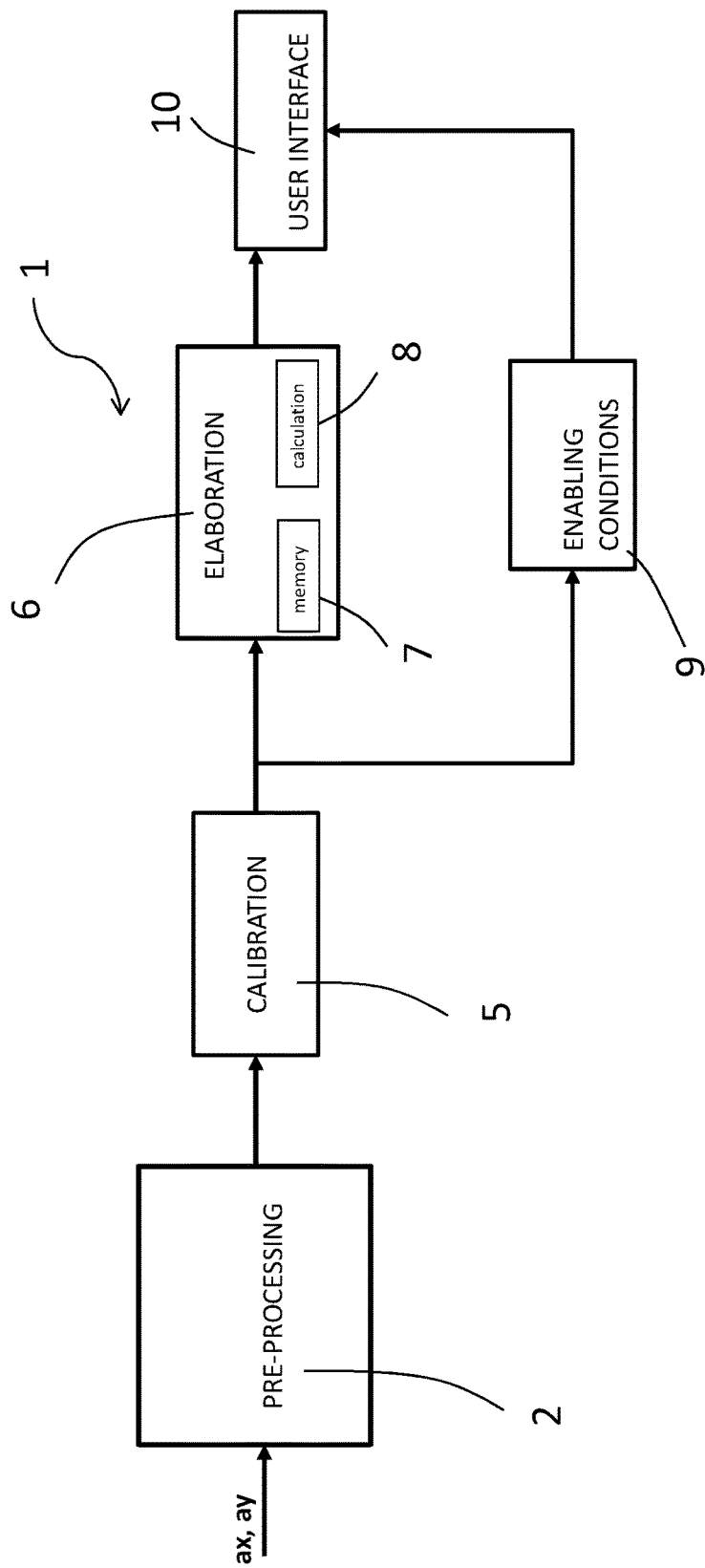
FIG. 2 is a block diagram representative of the system for estimating the driving style according to a possible embodiment of the invention.

FIG. 2 shows a block diagram, representative of the system for estimating the driving style according to the invention. The system is indicated, as a whole, with the reference 1. Each system module is suitable to implement one or more steps of a method, for estimating the style of a vehicle driver. Note that, in the present description and in the appended claims, system 1, as well as the elements named "module", can be implemented using hardware devices (e.g. control units), software or a combination of hardware and software.

System 1 receives input signals representative of the longitudinal acceleration $a_x$ and of the lateral acceleration $a_y$, detected by the measuring device.

Figure 3:
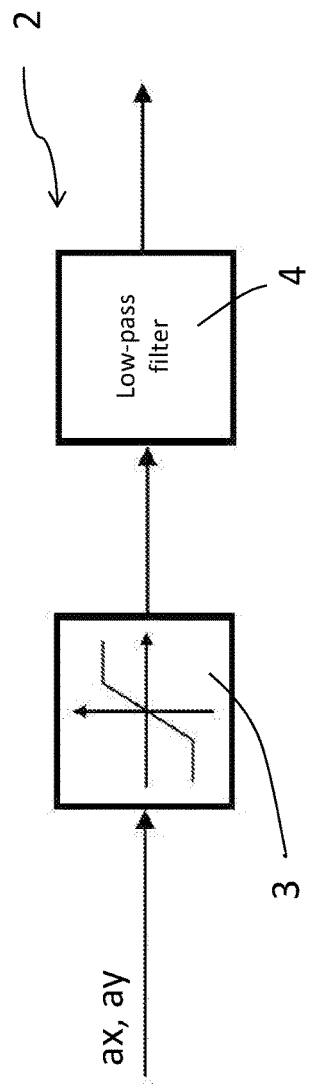
FIG. 3 is a block diagram representative of a part of the system for estimating the driving style in FIG. 2.

According to a possible embodiment, system 1 comprises a module 2 for pre-processing the signals, representing the longitudinal acceleration $a_x$ and the lateral acceleration $a_y$. Such pre-processing module 2 is shown in more detail in FIG. 3. More in particular, the pre-processing module 2 comprises a first non-linear filter 3, for the filtering of out-of-scale signals, preferably samples not included between $-10$ and $+10$ m/s^2.

Module 2 further and preferably comprises a second low-pass filter 4, preferably a first order filter with a cut-off frequency of 1 Hz.

Referring again to FIG. 2, system 1 comprises a calibration module 5, which receives input signals representative of the longitudinal acceleration $a_x$ and of the lateral acceleration $a_y$, possibly pre-processed by the pre-processing module 2. The function of module 5 is to align the axes of the measuring device, such as, for example, of an inertial measurement unit, with the longitudinal and lateral axes of the vehicle, in which the measuring device is installed. The calibration module 5, for example, may operate by taking measurements when the vehicle is still, so to determine a rotation matrix, capable of implementing an axes alignment. The calibration module 5 preferably acts only in the starting phase of the system, or, alternatively, only while enabling the system on a specific vehicle, intervening later again only when a new calibration is necessary.

System 1 further comprises the previously mentioned elaboration module 6, configured to provide an indication of the driver's driving style, from the vehicle longitudinal $a_x$ and lateral $a_y$ accelerations, measured along the measuring path with the following method.

System 1, in particular the elaboration module 6 itself, comprises a memory module 7, wherein pairs of the admissible limit values of the longitudinal and lateral accelerations are stored. These pairs of values, if represented in a two dimensional plane longitudinal acceleration $a_x$ (ordinate) and lateral acceleration $a_y$ (abscissa), form a closed admissible acceleration curve, which represents the limits of the driver's admissible behaviour.

Figure 4:
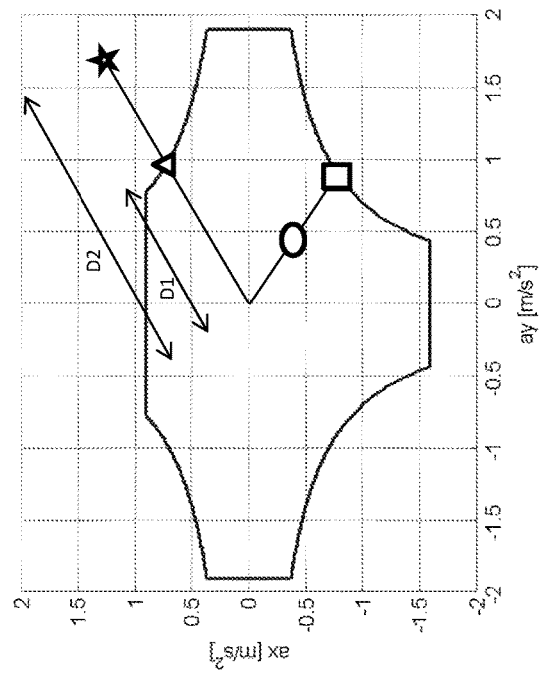
FIG. 4 is a possible admissible acceleration curve at the base of the system and of the method for estimating the driving style according to the invention.

FIG. 4 shows a possible curve of the admissible acceleration, represented following the above-mentioned characteristics. The curve is preferably symmetrical with respect to the longitudinal accelerations axis and asymmetrical with respect to the lateral accelerations axis. This means that the curve has limit values of longitudinal acceleration and deceleration, with different absolute values. In particular and preferably, the limit value of the lateral deceleration is, as absolute value, greater than the limit value of the lateral acceleration. With regard to the limit values of the lateral acceleration and deceleration, they are instead preferably equal for their absolute values. Such contiguous limit values are not, however, directly linked (in which case the admissible acceleration curve would be rectangular), but are preferably linked together by means of concave curves, e.g. equilateral hyperbolas such as:

$$a_y = \pm k/a_x$$

The admissible acceleration curve, so structured, tends to limit the mixed longitudinal and lateral accelerations: in other words, it tends to limit the driver's accelerations and decelerations, while steering.

The described admissible acceleration curve is particularly suitable for an application on garbage trucks. Of course, in case of different types of vehicles or in case of different uses, curves of admissible acceleration with different structures (from the one previously shown) can be considered.

The elaboration module 6 is configured so to associate with each vehicle pair, longitudinal acceleration $a_x$-lateral acceleration $a_y$, measured by the measuring device, a corresponding pair, longitudinal acceleration-lateral acceleration, on the admissible acceleration curve. In other words, the elaboration module 6 univocally associates an ideal acceleration value with each detected acceleration of the vehicle. Such value is represented by a point on the admissible acceleration curve. Depending on the position of the measured longitudinal acceleration-lateral acceleration pair (represented by a point in the plane, where the admissible acceleration curve lies) with respect to the corresponding longitudinal acceleration-lateral acceleration pair on the admissible acceleration curve (represented by a point on the curve of the admissible acceleration itself), the elaboration module is able to provide an indication of the driver's driving style. Possible methods for implementing this estimation are provided hereafter.

Still referring to FIG. 4, the elaboration module 6 is configured so to determine the longitudinal acceleration-lateral acceleration pair on the curve of the admissible acceleration, corresponding to the measured longitudinal acceleration-lateral acceleration pair by calculating the intersection between the admissible acceleration curve and the line, joining the point corresponding to the measured longitudinal acceleration-lateral acceleration pair with the axes origin of the longitudinal acceleration-lateral acceleration plane, where the admissible acceleration curve lies. For example, if the point corresponding to the measured longitudinal acceleration-lateral acceleration pair is the one labelled with a star in FIG. 4 (outside the admissible acceleration curve), the longitudinal acceleration-lateral acceleration pair on the admissible acceleration curve is obtained as the intersection of this curve with the line, that joins the point, labelled with a star, with the axes origin, i.e.

with the point corresponding to longitudinal acceleration and lateral acceleration null. This point is labelled with a triangle.

If, on the contrary, the point corresponding to the measured longitudinal acceleration-lateral acceleration pair is the one labelled with a circle in FIG. 4 (inside the admissible acceleration curve), the longitudinal acceleration-lateral acceleration pair on the admissible acceleration curve is obtained in the same way, i.e. as the intersection of this curve with the line passing in the point, labelled with a circle, and the axes origin. This point is labelled with a square.

With reference to the first example (point on the admissible acceleration curve, labelled with a triangle), system 1, in particular the elaboration module 6, comprises a calculation module 8, configured so to calculate a first distance D1 along the line, drawn in said manner between the point labelled with a triangle (ideal acceleration) and the axes origin, and a second distance D2, along said line, between the point labelled with a star (real acceleration) and the axes origin. These distances, corresponding to the measured acceleration module of the vehicle and to the respective acceleration module on the admissible acceleration curve, can be calculated through the following mathematical relationships:

$$D_1 = \sqrt{a_{x_{\lim}}^2 + a_{y_{\lim}}^2}$$

$$D_2 = \sqrt{a_x^2 + a_y^2}$$

Considering the previously explained meaning of the first D1 and second D2 distances, the elaboration module 6 is able, on the basis of the trends of D1 and D2 in the time domain along the measuring path, to determine a safety index, representative of the driving style of the vehicle driver.

In particular, advantageously, the calculation module 8 is configured so to determine the ideal accelerations module $A_{I_{mod}}$, as the minimum between the first D1 and second D2 distances:

$$A_{I_{mod}} = \min(D_2, D_1)$$

In addition, the calculation module 8 is configured so to calculate a real accelerations module $A_{R_{mod}}$, given by the sum of the ideal accelerations module and of a penalty coefficient Cp, which increases when the difference between the second D2 and the first D1 distances increases, and which is null, if the second distance D2 is smaller than or equal to the first distance D1.

$$A_{R_{mod}} = A_{I_{mod}} + Cp$$

The penalty coefficient Cp can take many forms. The penalty coefficient Cp can be simply given by the difference between the second D2 and the first D1 distances (only if D2 is greater than D1) and, in this case, the real accelerations module $A_{R_{mod}}$ increases linearly with such difference. Alternatively and preferably, the penalty coefficient Cp can take such a form as to penalize the driver most when such difference increases, namely in such a way that the real accelerations module $A_{R_{mod}}$ is greater than the effective absolute value of the accelerations, measured by the measuring device for a quantity greater than the difference between the second D2 and the first D1 distances. For example, the penalty coefficient Cp can take an exponential form and the real accelerations module can take the following form:

$$A_{R_{mod}} = A_{I_{mod}} + e^{2(D_2 - A_{I_{mod}})}$$

The calculation module 8, with further advantage, is also configured so to calculate the integral $I_{AR}$ of the real accelerations module, in the time domain corresponding to the measuring path, and the integral $I_{AI}$ of the ideal accelerations module, in the time domain corresponding to the measuring path, in the following manner:

$$I_{A_R} = \int A_{R_{mod}} dt$$

$$I_{A_I} = \int A_{I_{mod}} dt$$

Figure 5:
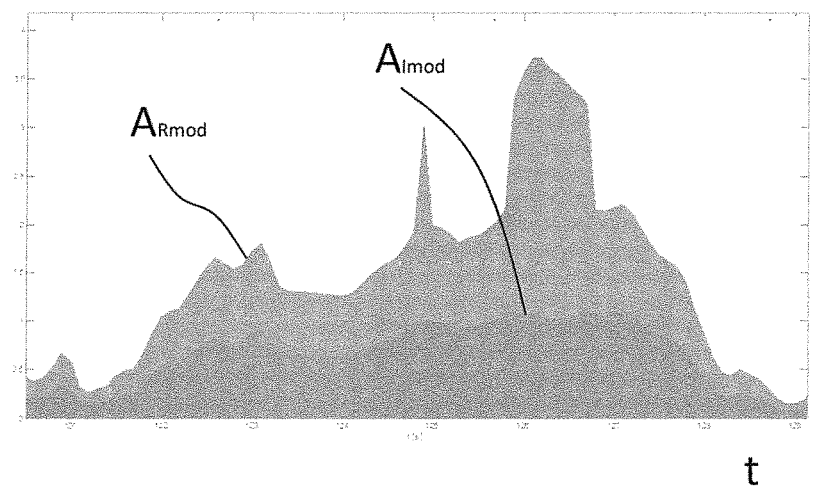
FIG. 5 shows a diagram with possible trends, in the time domain, of the real accelerations module and of the ideal accelerations module of a vehicle, equipped with the system for estimating the driving according to the invention.

FIG. 5 shows an example of possible trends in the time domain t of the real accelerations module $A_{Rmod}$ and of the ideal accelerations module $A_{Imod}$. The respective integrals of the real acceleration module $I_{AR}$ and of the ideal acceleration module $I_{AI}$ in the time domain t are given by the areas subtended by their respective curves.

According to their definition, the real accelerations module $A_{Rmod}$ can never be smaller than ideal accelerations module $A_{Imod}$. Consequently, the integral of the real accelerations module $I_{AR}$ remains equal to the integral of the ideal acceleration module $I_{AI}$, in case of virtuous driving by the driver along the whole measuring path; but it increases in comparison with the latter, whenever the driver performs inadmissible manoeuvres, i.e. whenever the point, representing the measured longitudinal acceleration-lateral acceleration pair, is out of the admissible accelerations curve. Such difference between the integral $I_{AR}$ of the real accelerations module and the integral $I_{AI}$ of the ideal accelerations module can never decrease along the same measuring path, but only increase or keep constant.

Therefore, the safety index, representing the driver's driving style can be determined by the calculation module 8 just on the basis of the difference between the integral $I_{AR}$ of the real accelerations module and the integral $I_{AI}$ of the ideal accelerations module (graphically defined by the space between the two curves of the real and ideal accelerations). For example, possible safety indices can be the following, respectively indicated as SI and Cia:

$$SI = \frac{I_{A_R} - I_{A_I}}{I_{A_R}}$$

$$Cia = (I_{A_R} - I_{A_I})$$

The safety index SI is normalized with respect to the integral $I_{AR}$ of the real accelerations module. Such safety index SI is therefore a percentage value suitable to define the driving style, for example in case of measuring paths, which alternate vehicle stops and movements, with similar average durations.

The safety index Cia, instead, is an absolute value suitable to define the driving style, for example in case of measuring paths alternating vehicle stops and movements, very different for their durations.

In both cases, if the safety index is equal to 0, it means that the driver held a virtuous driving style, therefore acceptable. The more the safety index is far from zero, the more the driver has been unruly, i.e. held an inadmissible driving style. The coefficient SI can reach a maximum value 1 (i.e. 100%), which indicates a totally unruly behaviour. The coefficient Cia, instead, can in principle grow indefinitely along the measuring path.

Figure 6:
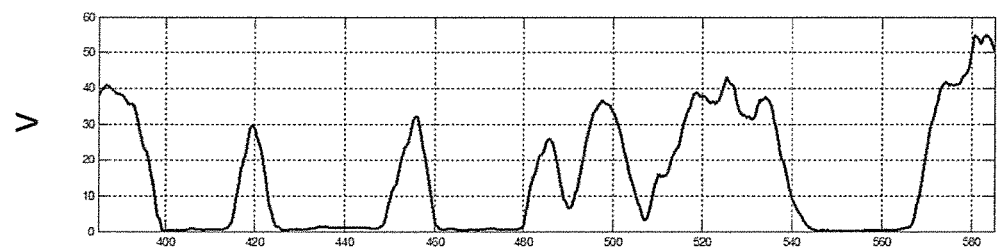
FIG. 6 shows two diagrams, related to possible speeds, and the integral of the real accelerations module of a vehicle, equipped with the system for estimating the driving according to the invention.
Figure 6:
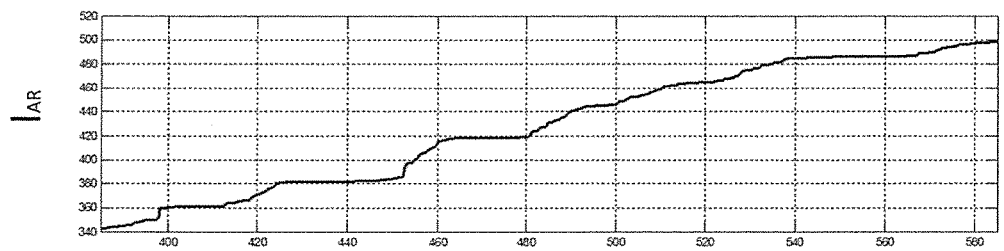

Preferably, system 1 is configured so to stop, and then halt the operations, which lead to a definition of the driving style, when the vehicle is stopping. In such condition, the longitudinal and lateral accelerations, measured by the measuring device, are null. Therefore, the integral of the real accelerations module $I_{AR}$ remains constant as long as the vehicle speed is null (or constant). This situation is shown, for example, in FIG. 6, wherein possible trends of the vehicle speed v and of the integral of the real acceleration module $I_{AR}$ in the time domain t are compared.

Advantageously, in order to distinguish the vehicle motion conditions during which an estimation of the driving style must be implemented (vehicle motion conditions), from the conditions where such estimation is not necessary (stop conditions), system 1 comprises a module 9, for determining the enabling conditions of the system. Such module 9 can determine the motion conditions as follows.

Figure 7:
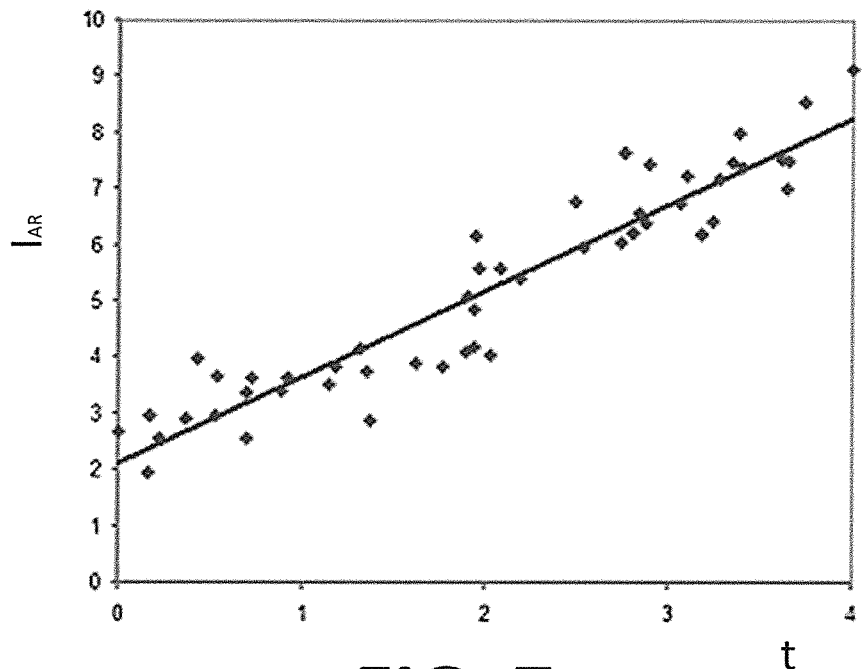
FIG. 7 shows a diagram with a linear regression line, generated from samples of the real accelerations integral of a vehicle, equipped with the system for estimating the driving according to the invention.

Module 9 can, for example, determine the slope of the linear regression line of the integral of the real accelerations module $I_{AR}$, in the sampling instants of the vehicle longitudinal and lateral accelerations. Samples are preferably limited to the last seconds of measurement, for example to the last 4 seconds. The situation is illustrated, by way of example, in FIG. 7, which shows samples of the integral of the real accelerations module $I_{AR}$ and the linear regression line in the time domain t. The slope b of the linear regression line can be calculated in the following manner:

$$b = \frac{N \sum_{i}^{N} x_i y_i - \sum_{i}^{N} x_i \sum_{i}^{N} y_i}{N \sum_{i}^{N} x_i^2 - \left(\sum_{i}^{N} x_i\right)^2}$$

wherein:

N is the number of the evaluated samples;

$x_i$ is the i-th sample of the integral of the real accelerations module $I_{AR}$;

$y_i$ are the sampling time instants.

Advantageously, module 9, for determining the system enabling conditions, is configured so to assess:

the enabling of the system, i.e. the need to estimate the driving style, if the slope b of the above mentioned linear regression line keeps greater than or equal to a slope threshold value for at least a predetermined time. This condition implies that the integral of the real accelerations module $I_{AR}$ is increasing and that the vehicle is then moving;

the disabling of the system, and thus the temporary stop of the driving style estimation, if such slope b keeps smaller than the slope threshold value for at least a predetermined time, which can, for example, be equal to the predetermined time considered for the enabling condition.

Whenever the system is disabled, as a consequence of a vehicle stop, the elaboration module can reset the integrals of the real accelerations and of the ideal accelerations modules, to start a new analysis, once the vehicle is started again.

Preferably, the system is configured so to distinguish the final stops from the temporary stops, i.e. to distinguish the vehicle stops during the measuring path (temporary stops), e.g. caused by traffic congestion or by red traffic-lights, from the stops caused by an end in the measuring path (final stops). In fact, close temporary stops are not considered as representative of the driving style.

To this purpose, advantageously, the module for determining the enabling conditions of system 9 is further configured so to determine a disabling of the system, if the real accelerations module integral $I_{AR}$ is greater than a threshold value of the integral of the accelerations module. In case of system shutdown, if, using the previously mentioned method, it's also verified that the integral of the real accelerations module $I_{AR}$ is greater than a threshold value of the integral of the accelerations module, then the integrals of the real accelerations module $I_{AR}$ and of the ideal accelerations module $I_{AI}$ are reset and, consequently, the safety indices analysis starts from zero again.

With reference to the user interface module previously introduced, it is schematically labelled with number 10 in FIG. 1b and in FIG. 2.

The user interface module 10 is an indicator of the driving style of the vehicle driver, so that he is aware of his behaviour, monitored by system 1 itself.

Figure 8:
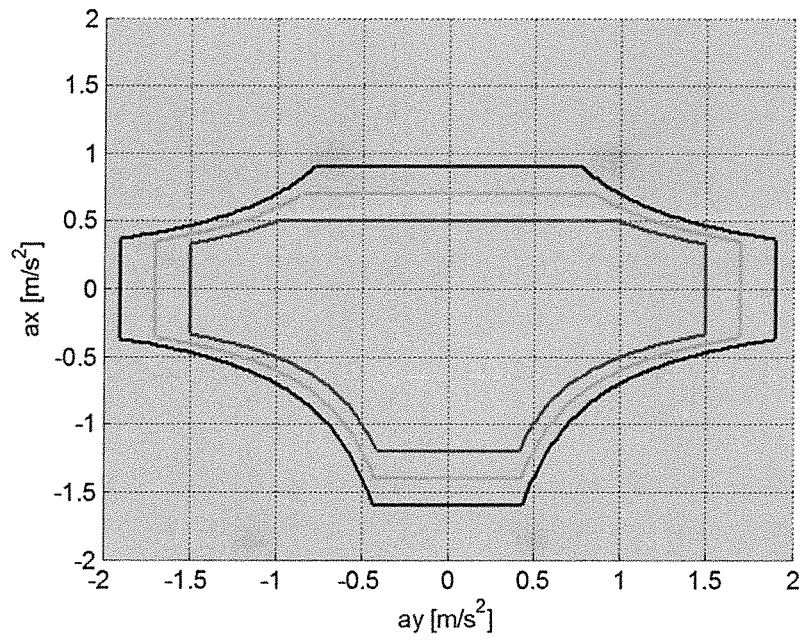
FIG. 8 shows a possible admissible acceleration curve at the base of the system and of the method for estimating the driving style according to the invention, where the area, delimited by such curve, is divided into parts with different admissibility as for the driving style.

To this end, the user interface module 10 comprises a first warning lights series 11, indicative of the instantaneous driving style of the driver. For example, such first warning lights series 11 can comprise three lights, respectively indicating: an admissible driving style, a driving style close to inadmissible conditions, an inadmissible driving style. The three warning lights, for example, can be respectively green, yellow and red. The switching on of the three lights of the first warning lights series 11 can be, for example, linked to the instantaneous conditions of longitudinal-lateral acceleration, measured by the measuring device, in particular by the point corresponding to these accelerations, detected with respect to the admissible acceleration curve. For example, with reference to FIG. 8, three concentric curves are represented with the same shape and different only for a scale factor. The outer curve corresponds to the admissible accelerations curve, as previously described. The two inner curves represent both acceptable accelerations conditions, but the halfway curve, nearer to the outer curve, delimits an area closer to the maximum admissible conditions. Therefore, the switching on of the first warning lights series can follow this logic:

if the point, representing the longitudinal acceleration-lateral acceleration pair, is in the area circumscribed by the halfway curve, but not on it, the first warning light (for example green) will switch on. This indicates an admissible driving style. The safety indices, as previously defined, remain null or, however, do not increase.

if the point, representing the longitudinal acceleration-lateral acceleration pair, is in the area between the outer curve and the halfway curve, but not on the outer curve, the second warning light (for example yellow) will switch on. This indicates an admissible driving style, but, in any case, close to inadmissible conditions. The safety indices, even in this case, remain null or, however, do not increase.

if the point, representing the longitudinal acceleration-lateral acceleration pair is on the outer curve or outside it, the third warning light (for example red) will switch on. This indicates an inadmissible driving style. The safety indices increase and can no longer become null, zero going.

Advantageously, the user interface module 10 further comprises a second warning lights series 12, which are switched on or off progressively as a function of the driving style gradually taken by the vehicle driver. Such second series warning lights 12, preferably kept all off at the beginning of the measuring path, are lit in succession, whenever the third light (for example red) of the first series switches on, i.e. whenever instantaneous conditions of inadmissible accelerations are detected. The driver is therefore aware of the numbers of times he had an inadmissible driving style during the measuring path. The number of the second series warning lights 12, switched on along the measuring path, can also be used as a parameter, indicative of the driving style. For example, if the second series warning lights 12 are equal in number to ten (but this number can, obviously, be different), the driving style is admissible as long as the second series warning lights are not all on. Once all these warning lights are on, the driver is considered unruly and can, for example, be sanctioned. In other words, the driver can drive in instantaneous inadmissible conditions for a limited number of times along the driving path. Once such number of detections of instantaneous inadmissible driving has been passed, the driver is considered unruly.

In case, the second series warning lights 12 can be gradually switched off along a driving path, when specific conditions occur. For example, if a predetermined time passed starting from the last switching on of a warning light of the second series 12, the last switched on warning light of the second series 12 can be switched off. So the driver is rewarded for his ruly behaviour, kept for the predetermined time, and can compensate for single moments of inadmissible driving style. It's also possible to switch off further second series warning lights 12, if a second predetermined time (preferably shorter) elapsed starting from the last switching off. So a driver with a lasting ruly driving style, who keeps off many second series warning lights 12, is further awarded.

The user interface module 10 may comprise a system for a forced switching off of the second warning lights series 12. Such a system is not generally available to the driver and may comprise, for example, a two-way transmitting system type RFID. For example, the interface module can be associated with a reader of RFID tags that reveals the passage of a RFID tag, for example incorporated in a card, near the reader itself, so switching off all the warning lights.

Note that each module, described with reference to system 1 for estimating the driving style, is suitable to implement a corresponding step of a method for estimating the driving style. Such method can be implemented, regardless of system 1 as described.

In particular, the method for estimating the driving style of a vehicle comprises the steps of:
measuring the vehicle longitudinal acceleration $a_x$ and the lateral acceleration $a_y$ along a measuring path, as previously defined;
associating to each measured longitudinal acceleration-lateral acceleration pair of the vehicle a corresponding longitudinal acceleration-lateral acceleration pair on an admissible acceleration curve, closed in a longitudinal acceleration-lateral acceleration plane, as previously described, for example with reference to FIG. 4;
providing an indication of the driving style, based on the trend of the position of the longitudinal acceleration-lateral acceleration pair, measured with respect to the corresponding longitudinal acceleration-lateral acceleration pair on the admissible acceleration curve along the measuring path.

In accordance with an embodiment, the step of associating with each measured longitudinal acceleration-lateral acceleration pair a corresponding longitudinal acceleration-lateral acceleration pair on the admissible acceleration curve comprises a step of calculating the intersection between the admissible acceleration curve and the line, joining the point corresponding to the measured longitudinal acceleration-lateral acceleration pair, with the axes origin of the longitudinal acceleration-lateral acceleration plane, where the admissible acceleration curve lies.

Preferably, said step of providing an indication of the driving style comprises the steps of:
calculating a first distance D1 along said line between the point, representing the longitudinal acceleration-lateral acceleration pair on the admissible acceleration curve, and said axes origin of the longitudinal acceleration-lateral acceleration plane;
calculating a second distance D2 along said line between the point, representing the measured longitudinal acceleration-lateral acceleration pair, and said axes origin of the longitudinal acceleration-lateral acceleration plane;
determining a safety index, representative of the driving style on the basis of a comparison between the trend of said first distance D1 and said second distance D2 in the time domain corresponding to the measuring path.

The determination of the distances D1 and D2 and of their use for calculating the safety indices has been previously described, for example with reference to FIG. 4.

In particular, the step of providing an indication of the driving style may comprise the steps of:
determining the ideal accelerations module $A_{Imod}$, given by the minimum between said first D1 and said second D2 distances;
determining a real accelerations module $A_{Rmod}$, given by the sum of ideal accelerations module $A_{Imod}$ and of the penalty coefficient Cp as previously defined, which increases when the difference between the second D2 and the first D1 distances increases, and which is null, if the second distance is smaller than or equal to the first distance;
calculating the ideal accelerations module integral $I_{AI}$ in the time domain corresponding to the measuring path, as previously described;
calculating the real accelerations module integral $I_{AR}$ in the time domain corresponding to the measuring path, as previously described;
determining said safety index (SI, Cia), representative of the driving style on the basis of the difference between said real accelerations integral $I_{AR}$ and said ideal accelerations integral $I_{AI}$.

Possible safety indices are the SI and Cia indices, previously defined.

The method may further comprise a step of determining the enabling conditions of the method, based on the calculation of the slope b of the linear regression line of samples of the real accelerations module integral $I_{AR}$ in the time domain, as previously described, as well as on the comparison between the real accelerations module integral $I_{AR}$ and a threshold value of the integral of the accelerations module, in order to distinguish final and temporary stops of the vehicle.

From the above description, the skilled person will be able to appreciate how the system and method for estimating the driving style of a vehicle driver allows to make accurate assessments on the admissibility of the driver's driving style from simple calculations and from a limited vehicle equipment. An estimation of the driving style can, therefore, be made with a low-cost and low-maintenance equipment.

The skilled person, in order to satisfy specific contingent needs, may make numerous additions, modifications or replacements of elements with other functionally equivalent, to the embodiments of the system and method described so far, without however departing from the scope of the appended claims.

The invention claimed is:

1. A system for estimating a driving style of a vehicle, comprising:
    a device for measuring vehicle longitudinal acceleration ($a_x$) and lateral acceleration ($a_y$) along a measuring path;
    a memory module in which admissible limit values pairs of the longitudinal and lateral accelerations are memorized so to form a closed admissible acceleration curve in a longitudinal acceleration-lateral acceleration plane;
    an elaboration module configured for:
        associating to each measured longitudinal acceleration-lateral acceleration pair of the vehicle a corresponding longitudinal acceleration-lateral acceleration pair on the closed admissible acceleration curve;
        providing an indication of the driving style on a basis of a trend of position of the measured longitudinal acceleration-lateral acceleration pair with respect to the corresponding longitudinal acceleration-lateral acceleration pair on the closed admissible acceleration curve along the measuring path,
    wherein the elaboration module comprises a calculation module for calculating:
        a first distance (D1) along a line between a point representing the longitudinal acceleration-lateral acceleration pair on the closed admissible acceleration curve and an axes origin of a longitudinal acceleration-lateral acceleration plane;
        a second distance (D2) along a line between a point representing the measured longitudinal acceleration-lateral acceleration pair and the axes origin of the longitudinal acceleration-lateral acceleration plane;
        a safety index (SI, Cia) representing the driving style on a basis of a comparison between trends of the first distance (D1) and the second distance (D2) along the measuring path, and
    wherein the calculation module is further configured to determine:
        an ideal accelerations module ($A_{Imod}$), calculated as a minimum between the first (D1) and second (D2) distances;
        a real accelerations module ($A_{Rmod}$), calculated as a sum of the ideal accelerations module ($A_{Imod}$) with a penalty coefficient (Cp) which increases when a difference between the second (D2) and the first (D1) distances increases and which is null if the second distance (D2) is less than or equal to the first distance (D1);
        an ideal accelerations module integral ($I_{AI}$) in a time domain corresponding to the measuring path; and
        the real accelerations module integral ($I_{AR}$) in the time domain corresponding to the measuring path;
        the safety index (SI, Cia) representing the driving style on a basis of a difference between the real accelerations module integral ($I_{AR}$) and the ideal accelerations module integral ($I_{AI}$).

2. The system according to claim 1, wherein the elaboration module is configured to determine the longitudinal acceleration-lateral acceleration pair on the closed admissible acceleration curve corresponding to the measured longitudinal acceleration-lateral acceleration pair by calculating an intersection between the closed admissible acceleration curve and the line joining the point corresponding to the measured longitudinal acceleration-lateral acceleration pair with the axes origin of the longitudinal acceleration-lateral acceleration plane in which the closed admissible acceleration curve lies.

3. The system according to claim 1, comprising a module constructed and arranged to determine enabling conditions configured to:
    determine a slope (b) of a linear regression line of samples of the real accelerations module integral ($I_{AR}$) in the time domain;
    enable the system if the slope (b) is greater than or equal to a slope threshold value for at least a predetermined time; and
    disable the system if the slope (b) is less than the slope threshold value for at least the predetermined time.

4. The system according to claim 3, wherein the module constructed and arranged to determine the enabling conditions is further configured to: determine the system as disabled if the real accelerations module integral ($I_{AR}$) is greater than an accelerations module integral threshold value.

5. The system according to claim 1, wherein the closed admissible acceleration curve is symmetric with respect to a longitudinal accelerations axis and asymmetric with respect to a lateral accelerations axis.

6. The system according to claim 1, wherein the closed admissible acceleration curve has longitudinal acceleration and deceleration limit values and lateral acceleration and deceleration limit values, wherein the limit values are joined by concave curves.

7. The system according to claim 1, further comprising a user interface module, the user interface module comprising:
    a first wanting lights series, each warning light of the series representing an instantaneous driving style of a driver of the vehicle;
    a second warning lights series which can be progressively switched on or switched off as a function of a progressively estimated driving style of the driver.

8. A method for estimating a driving style of a vehicle, comprising the steps of:
    measuring a longitudinal acceleration ($a_x$) and a lateral acceleration ($a_y$) of the vehicle along a measuring path;
    associating to each measured longitudinal acceleration-lateral acceleration pair of the vehicle a corresponding longitudinal acceleration-lateral acceleration pair on a closed admissible acceleration curve in a longitudinal acceleration-lateral acceleration plane;
    providing an indication of the driving style on a basis of a trend of a position of the measured longitudinal acceleration-lateral acceleration pair with respect to the corresponding longitudinal acceleration-lateral acceleration pair on the closed admissible acceleration curve along the measuring path, wherein the step of providing an indication of the driving style comprises the steps of:
        calculating a first distance (D1) along a line between a point representing the longitudinal acceleration-lateral acceleration pair on the closed admissible acceleration curve and a longitudinal acceleration-lateral acceleration plane axes origin;
        calculating a second distance (D2) along a line between a point representing the measured longitudinal acceleration-lateral acceleration pair and the longitudinal acceleration-lateral acceleration plane axes origin;
        determining a safety index (SI, Cia), representing the driving style on a basis of a comparison between trends of the first distance (D1) and the second distance (D2) in a time domain corresponding to the measuring path;

determining an ideal accelerations module ($A_{Imod}$), calculated as a minimum between the first (D1) and second (D2) distances;

determining a real accelerations module ($A_{Rmod}$), calculated as a sum of an ideal accelerations module ($A_{Imod}$) with a penalty coefficient (Cp), which increases when a difference between the second (D2) and the first (D1) distances increases and which is null if the second distance (D2) is less than or equal to the first distance (D1);

calculating an ideal accelerations module integral ($I_{AI}$) in the time domain corresponding to the measuring path;

calculating a real accelerations module integral ($I_{AR}$) in the time domain corresponding to the measuring path; and determining the safety index (SI, Cia), representing the driving style on a basis of a difference between the real accelerations module integral ($I_{AR}$) and the ideal accelerations module integral ($I_{AI}$).

9. The method according to claim 8, wherein the step of associating to each measured longitudinal acceleration-lateral acceleration pair a corresponding longitudinal acceleration-lateral acceleration pair on the closed admissible acceleration curve comprises a step of: calculating an intersection between the closed admissible acceleration curve and the line joining the point corresponding to the measured longitudinal acceleration-lateral acceleration pair with the axes origin of the longitudinal acceleration-lateral acceleration plane, in which the closed admissible acceleration curve lies.

10. The method according to claim 8, further comprising a step of determining enabling conditions of the method, which comprises the steps of:

determining a slope (b) of a linear regression line of samples of the real accelerations module integral ($I_{AR}$) in the time domain;

enabling the method, if the slope (b) is greater than or equal to a slope threshold value for at least a predetermined time;

disabling the method, if the slope (b) is less than the slope threshold value for at least the predetermined time.

11. The method according to claim 10, wherein the step of determining the enabling conditions of the method further comprises a step of: determining the system to be disabled if the real accelerations module integral ($I_{AR}$) is greater than an accelerations module integral threshold value.

* * * * *